UNITED STATES PATENT OFFICE.

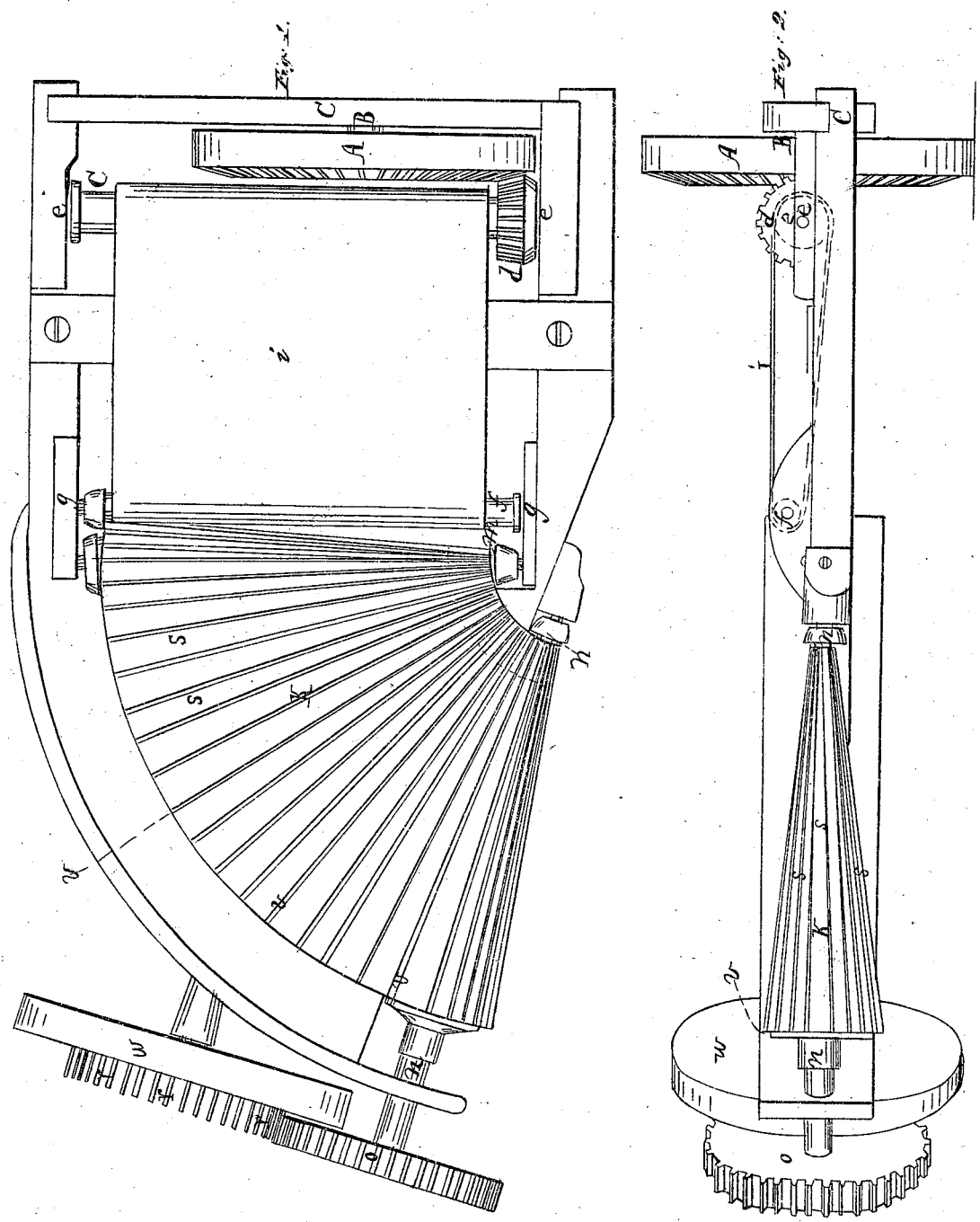

JOHN McPHERSON, OF PENNINGTON, NEW JERSEY.

IMPROVEMENT IN HARVESTING-MACHINES.

Specification forming part of Letters Patent No. 24,226, dated May 31, 1859.

*To all whom it may concern:*

Be it known that I, JOHN MCPHERSON, of Pennington, in the county of Mercer and State of New Jersey, have invented a new and useful Improvement in Harvesters; and I do hereby declare that the following is a full, clear, and exact description of the same, reference being had to the accompanying drawings, forming a part of this specification, in which—

Figure 1 is a plan or top view of a harvester with my improvement applied to it. Fig. 2 is a rear view of the same.

Similar letters of reference in each of the several figures indicate corresponding parts.

My invention relates to that class of harvesters which deliver the grain in gavels in rear of the machine.

To enable others skilled in the art to make and use my invention, I will proceed to describe its construction and operation.

A is the main wheel of the harvester, the axle B of which has its bearing in the frame C of the machine. The inner side of the wheel A is cogged, and gears into the pinion $d$ on the roller $c$, the latter having its bearings at $e$ $e$ in the frame of the machine.

$f$ is a roller, having its bearings at $g$ $g$ in the main frame of the machine. An endless apron, $i$, passes around the rollers $c$ and $f$ for the purpose of conveying the grain from the endless apron $i$ onto the curved flexible slotted apron $k$. The apron $k$ is curved, as shown in the drawings, in order to deliver the grain in gavels at the rear of the machine, so that the gavels lie transversely to or at right angles with the line of travel of the machine. It is supported by two conical rollers, $m$ and $n$, which have their bearings in the main frame of the machine. The apron $k$ is operated by means of a pinion, $o$, on the axis of the conical roller $n$, gearing into the pins $r$ on the wheel $w$, the latter having its axle-bearing in the main frame of the machine. The gearing of the pinion $o$ and wheel $w$, which operate the curved flexible slotted platform, is so arranged relatively, as regards speed, to the gearing which operates the endless apron $i$ that the grain is deposited in gavels, instead of being deposited on the ground continuously, which would occur if both aprons moved with the same velocity. The wheel $w$ is placed obliquely in order to prevent side draft.

The apron $k$ is constructed by attaching to an endless apron, $r$, passing around the conical rollers $m$ $n$, by any suitable means, the slats $s$, which are made tapering, in order that they may conform to the curved shape of the platform. The slats open in passing around the conical rollers $m$ and seize the grain delivered by the apron $i$, and the spaces between the slats likewise assist in the delivery of the grain.

I am aware that conical rollers have been employed for the delivery of grain in gavels at the rear of the machine; but such rollers, apart from the expense of construction and the increased weight of the machine—a very important point in the practical employment of harvesters—have a tendency to draw the grain between them as it falls longitudinally with them, thereby clogging the machine, increasing the draft, injuring the grain, and rendering the machine inoperative.

I am also aware that curved belts have been used, probably to obviate the defects arising from the use of the conical rollers; but when the curved belts are employed the grain is liable to fall between them, and in its fall prevents the formation of the grain into gavels in rear of it by obstructing the passage of the grain over the belts.

What I claim as my invention, and desire to secure by Letters Patent, is—

1. The curved slotted flexible apron $k$, when constructed in the manner and for the purposes set forth.

2. The combination of the endless apron $i$ with the curved slotted flexible apron $k$, the whole being constructed and arranged in the manner and for the purposes set forth.

The above specification of my improvement in harvesting-machines signed by me this 3d day of May, 1859.

JOHN McPHERSON.

Witnesses:
G. YORKE ATLEE.
H. H. YOUNG.